United States Patent
Skurich et al.

(10) Patent No.: US 8,459,322 B2
(45) Date of Patent: Jun. 11, 2013

(54) PNEUMATIC TIRE

(75) Inventors: Michael Stefan Skurich, Canton, OH (US); Lisa Marie Missik-Gaffney, North Jackson, OH (US); David Ray Hubbell, Hartville, OH (US); Teresa Diane Martter, Akron, OH (US); George Frank Balogh, North Canton, OH (US); Arthur Allen Goldstein, Mayfield Village, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1425 days.

(21) Appl. No.: 11/958,402

(22) Filed: Dec. 18, 2007

(65) Prior Publication Data

US 2009/0151845 A1 Jun. 18, 2009

(51) Int. Cl.
*B60C 15/00* (2006.01)
*B60C 15/06* (2006.01)

(52) U.S. Cl.
USPC ............ 152/539; 152/543; 152/546; 152/555

(58) Field of Classification Search
USPC ................. 152/555, 547, 546, 545, 544, 543, 152/542, 541, 540, 539
See application file for complete search history.

(56) References Cited

U.S. PATENT DOCUMENTS

| | | | | |
|---|---|---|---|---|
| 4,735,247 A | * | 4/1988 | Makino et al. | 152/209.5 |
| 5,898,047 A | * | 4/1999 | Howald et al. | 152/152.1 |
| 7,060,146 B2 | * | 6/2006 | Ikeda et al. | 156/130.7 |

FOREIGN PATENT DOCUMENTS

EP 1310385 * 5/2003

* cited by examiner

*Primary Examiner* — Justin Fischer
(74) *Attorney, Agent, or Firm* — Richard B. O'Planick

(57) ABSTRACT

A pneumatic radial tire has a chipper in place of a traditional apex, the chipper located between a carcass main portion and turnup portion. The chipper layer may be composed of a chopped carbon fiber and aramid composite reinforced elastomeric layer. The tire sidewalls have a radial height SH and a section width SW located within a range of 0.4 to 0.44 of the sidewall radial height SH measured from the bead core. The section width SW may further be located within a range of 0.1" to 0.3" inches from a radially outward end of the chipper layer in a radial direction. The tread may of a dual layer construction, having a radially inward first layer formed of a relatively low rolling resistance compound and a radially outward second layer formed of a compound containing silica.

12 Claims, 3 Drawing Sheets

PNEUMATIC TIRE

FIELD OF THE INVENTION

The present invention is directed towards a pneumatic tire. More specifically, the present invention is directed towards a pneumatic tire demonstrating low rolling resistance while maintaining a satisfactory level of stiffness for handling.

BACKGROUND OF THE INVENTION

Pneumatic tires for passenger cars typically have a symmetrical internal construction; the symmetric being centered on the lateral center, or equatorial plane, of the tire. It is desirable to design pneumatic passenger tires so as to enhance fuel efficiency (minimize rolling resistance) of the vehicle. However, desired improvement in minimizing tire rolling resistance, to be acceptable to the market, must not be at the expense of tire handling performance. While it is known to reduce the mass or weight of a tire in order to reduce the rolling resistance of the tire, achieving low rolling resistance while maintaining handling performance has proven to be problematic.

SUMMARY OF THE INVENTION

The present invention is directed to a tire designed having improved lower rolling resistance and acceptable tire handling performance.

In one aspect of the invention, a pneumatic radial tire having a circumferentially extending equatorial plane of the tire is provided comprising a carcass and a tread radially outward of the carcass. The carcass has at least one carcass reinforcing ply, opposing bead portions, and opposing sidewalls. The carcass reinforcing ply has a main portion extending between the opposing bead portions and a pair of turnup portions. Each turnup portion extends from one end of the main ply portions, each bead portion having a bead core, and a reinforcement cavity outward of each bead core. The cavity is located between the main portion and one turnup portion of the reinforcing ply. A chipper layer is located in the reinforcement cavities in each bead portion of the tire adjacent to the carcass reinforcing ply, the chipper layer being composed of a chopped carbon fiber and aramid composite reinforced elastomeric layer.

In another aspect of the invention, the chipper layer is located adjacent to and axially inward of the carcass reinforcing ply turnup portion and adjacent to and axially outward of the carcass reinforcing ply main portion.

In another aspect of the invention, the chipper layer has a constant thickness along a midsection within a range of 0.005 and 0.015 inches.

In another aspect of the invention, the tire sidewalls have a radial height SH extending from a radially inward end proximate a bead core and extending to a radially outer end proximate the tread, the tire having a section width SW located within a range of 0.4 to 0.44 of the sidewall radial height SH measured from the bead core.

In another aspect of the invention, SW is located within a range of 0.1" to 0.3" inches from a radially outward end of the chipper layer in a radial direction.

In yet a further aspect of the invention, the tread comprises a radially inward first layer formed of a relatively low rolling resistance compound and a radially outward second layer formed of a compound containing silica.

Definitions

The following definitions are applicable to the present disclosure and are used consistently as defined below:

"Apex" means an elastomeric filler located radially above the bead core and between the plies and the turnup ply.

"Aspect Ratio" means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Casing" means the carcass, belt structure, beads, sidewalls, and all other components of the tire excepting the tread and undertread. The casing may be unvulcanized rubber or previously vulcanized rubber to be fitted with a new tread.

"Chafers" refers to narrow strips of material placed around the outside of the bead to protect cord plies from the rim, distribute flexing above the rim, and to seal the tire.

"Chipper" refers to a narrow band of fabric or steelcord located in the bead area whose function is to reinforce the bead area and stabilize the lower sidewall "Circumferential" means lines or directions extending along the perimeter of the surface of the annular tread perpendicular to the axial direction.

"Cord" means one of the reinforcement strands of which the plies in the tire are comprised.

"Lateral" means an axial direction.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65 degrees and 90 degrees with respect to the equatorial plane of the tire.

"Section Height" means the radial distance from the nominal rim diameter to the outer diameter of the tire at its equatorial plane.

"Section Width" ("SW") means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge, tread shoulder or shoulder rib means that portion of the tread near the shoulder.

"Sidewall" means that portion of a tire between the tread and the bead.

"Tread" means that portion of the tire that comes into contact with the road under normal inflation and load.

"Tread width (TW)" means the arc length of the tread surface in the axial direction, that is, in a plane passing through the axis of rotation of the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
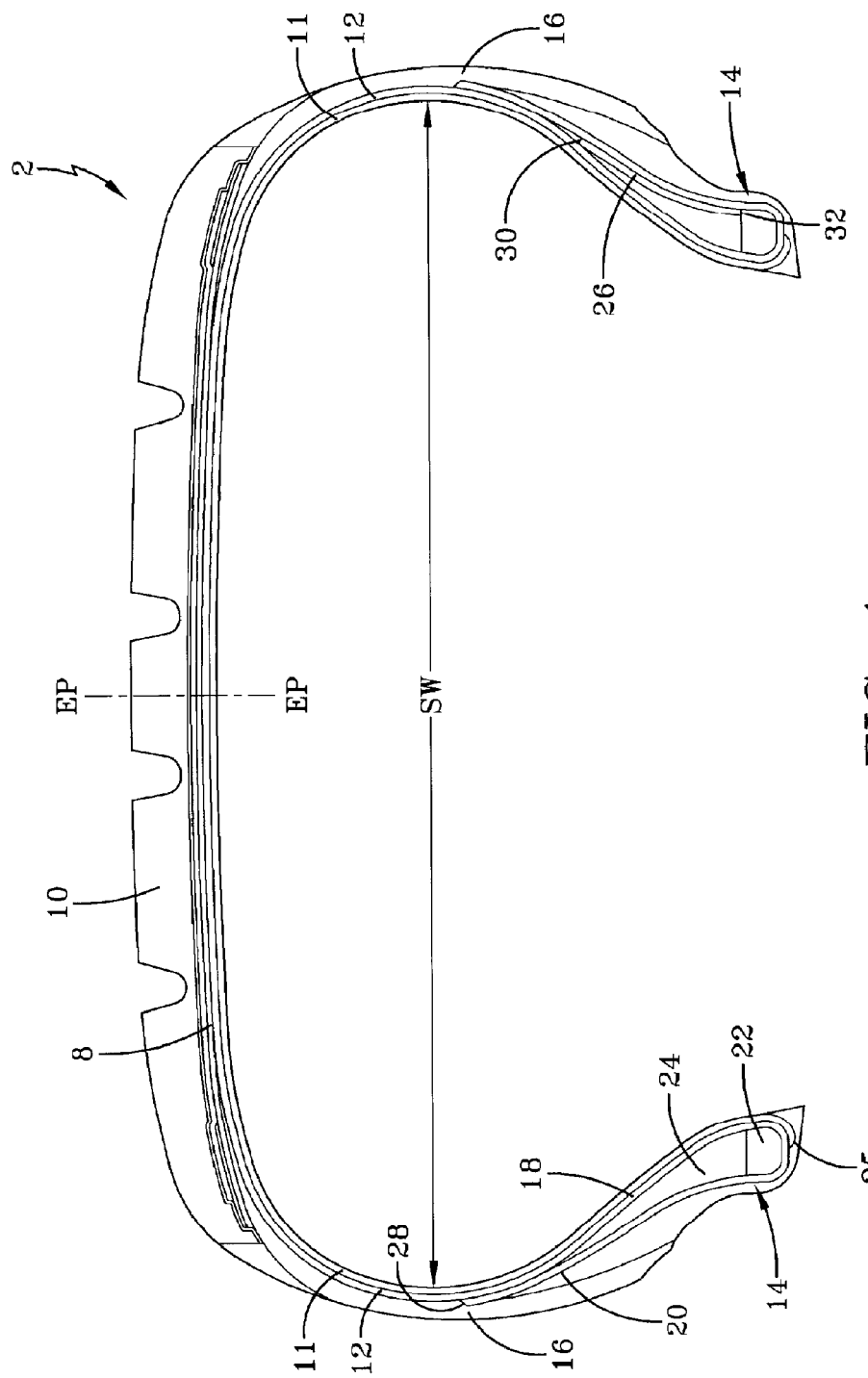
FIG. 1 is a transverse section view of a tire representing the prior art.

FIG. 1 illustrates a tire representative of the prior art. The pneumatic tire 2 is a low aspect radial tire, preferably designed for use as a production passenger tire. The pneumatic tire has a carcass, a belt structure 8 radially outward of the carcass, and a tread 10 radially outward of the belt structure 8. The belt structure 8 may be any of the type conventionally used for a passenger vehicle tire, and generally will include two reinforcement plies of cords with overlay plies covering at least the axially outer edges of the individual belt reinforcement plies.

The carcass has an inner liner 11, at least one carcass reinforcing ply 12, a pair of opposing bead portions 14 and a pair of opposing sidewalls 16. The tire of FIG. 1 is illustrated as having an inner liner 11 and one carcass reinforcing ply, 12, but it is within the skill of those in the art to form the tire of FIG. 1 as a two ply carcass. The ply 12 has a main portion 18 extending through the opposing sidewalls 16 and two turnup portions 20 initiating in the bead portions 14. Each turnup portion 20 of the carcass reinforcing ply 12 extends from the main portion 18 of the carcass reinforcing ply 12, and is wrapped about a bead core 22 and a bead apex 24 in the bead portion 20; thus enveloping, at a minimum, the bead core 22 and the lower portion of the bead apex 24 in each bead portion 14. The turnup portion 20 in the tire of FIG. 1 terminates at a distance radially above or below the maximum section width of the tire.

In the opposing bead portions 14, the bead apexes 24 have generally the same radial height. Bead apexes 24 are typically configured having a dimension of 0.30 inches at the base, 0.16 inches at a mid-point, and 0.075 inches proximate the top. The height of apex 24 may be on the order of 1.46 inches. Placed in one bead portion 14 of the tire is a bead reinforcing layer 26. The bead reinforcing layer 26 may be a chopped carbon fiber reinforced elastomeric layer with a chopped carbon fiber content. In other prior art tires (not shown), conventional chipper plies are formed of textile cords. The use of carbon fiber reinforcement at 26 provides a tensile strength and breaking load strength greater than conventional textile materials.

In the tire shown in FIG. 1, the bead reinforcing layer 26 is located within the turnup envelope and directly adjacent to the bead apex 24. The bead reinforcing layer 26 extends from an initial point 32 near the bead core 22 to a radially outer terminal end 30. The radially inner initial point 32 of the bead reinforcing layer 26 does not have any overlap with the bead core 22, but is spaced from the radially outer surface of the bead core 22; preventing the end 32 of the bead reinforcing layer 26 from being pinched between the bead core 22 and the carcass reinforcing ply 12. The inner liner 11 extends to a lower end 25.

The stiffness of the tire in FIG. 1 may be affected by variations in the tread rubber compound selected for lateral zones across the tire tread 10. If it is desired to increase, or enhance the stiffness of the outboard tread half, the tread rubber, or even just a tread base rubber, may be selected to have a greater hardness or stiffness characteristic than the inboard tread half. If it is desired to equalize the tread half stiffness, the inboard tread half may be the tread portion provided with a tread rubber or tread base rubber with a greater hardness or stiffness characteristic than the outboard tread half. It is known to form the tread 10 from a compound providing desired wet and dry handling characteristics. As the tread 10 wears from use of the tire, the newly exposed material uncovered will be of like material composition and will exhibit the same performance characteristics as the outer surface of the tread 10 prior to tire use.

Figure 2:
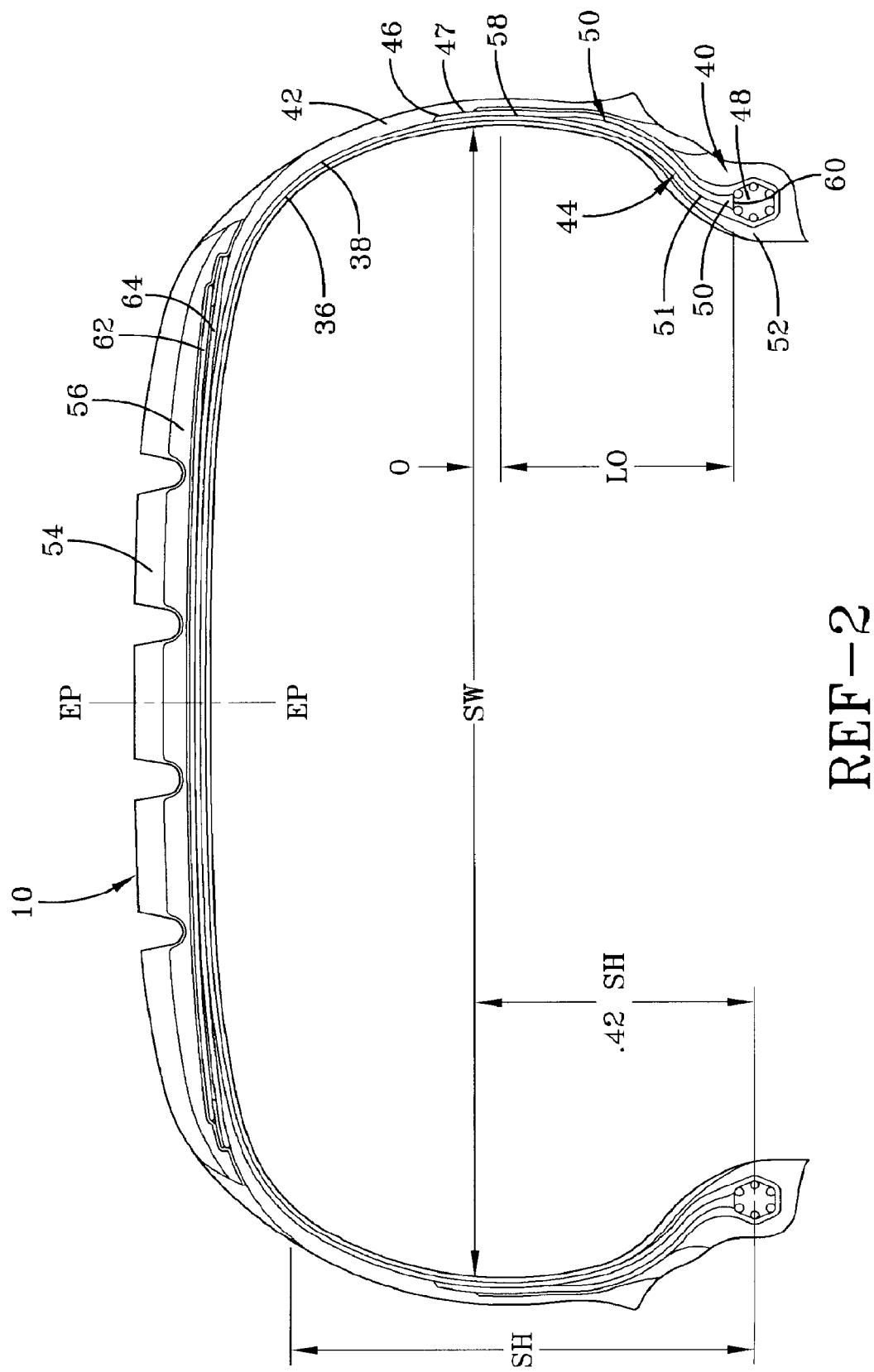
FIG. 2 is a transverse section view of one embodiment of the present invention.

With reference to FIG. 2, a tire 34 exhibiting enhanced low rolling resistance includes a tread 10; a liner 36, a carcass reinforcing ply 38; bead portions (2) 40; and sidewalls (2) 42. The ply 38 has a ply main portion 44 extending radially outward from a bead portion 40. Ply 38 turn up portion 47 extends about a bead core 48 located within the bead portion 40 and terminates at a turn up end 46. A chipper 50 is situated between the ply main portion 44 and the ply turn up portion 47. A chafer 51 is located outward from the turn up portion 47 and is located in the bead portion 40 to resist chafing of the tire from the wheel rim (not shown). The tire inner liner 36 extends to a terminal end 52 located opposite and radially inward of the bead core 48. The tread 10 is configured having a cap layer 54 and an under tread or sub-tread layer 56.

The chipper 50 is an elongate layer situated between the ply turn up portion 47 and the ply main portion 44 and extends from an outer end 58 to an inner end 60. The chipper 50 is preferably although not necessarily formed of an aramid and carbon fiber fabric and replaces a traditional apex to remove gauge, weight, and hysteretic material while maintaining stiffness in the tire for handling. Aramid (Flex 10) Nylon may be utilized. The chipper 50 is formed having a substantially uniform gauge thickness between ends 58, 60. A preferred uniform thickness of 0.030" at all points along the chipper 50 may be employed. The uniform thickness in the chipper and light weight but strong aramid fabric composition of the chipper 50 maintains stiffness for handling while reducing rolling resistance and mass. SW of the tire of FIG. 2 is located at a lower position relative to conventional tires, toward the bead portion 40 of the tire. As shown, the section width SW is within 40 and 44 percent of the sidewall height SH as measured from the bead 48. The relative location of SW toward the bead area in conjunction with the construction (uniform gauge thickness of chipper nominally 0.030 at all points), composition (aramid and carbon fiber composite fabric), and location of the chipper 50 (between the ply main portion 44 and turn up 47) within the bead portion 40 serves to maintain lower sidewall stiffness of the tire for handling. The chipper outer end 58 is preferably located close to the SW of the tire, such as within a distance range "D" of 0.1" to 0.3" inches. Thus, the chipper 50 spans substantially the lower portion of the sidewall from the sidewall SW to the bead core 48, again resulting in a stiffer lower sidewall for handling. The chipper 50 accordingly replaces a traditional apex and thereby reduces the mass of the tire to reduce the tire's rolling resistance while still maintaining lower sidewall stiffness for handling.

The use of a dual layer tread cap compound is employed wherein the cap 54 has an outer silica based compound layer for good rolling resistance and good wet and dry performance, and a low rolling resistance base layer underneath the outer compound layer for reducing tire rolling resistance. The base layer is preferably formed of a comparatively stiff compound exhibiting low hysteresis that will contribute to reduce the rolling resistance of the tire. The dual layer tread cap thus reduces tire rolling resistance by material selection and compounding of the tread cap layers while the chipper and lowered SW of the tire contribute to reduce tire rolling resistance in the manner described above.

In order to further reduce rolling resistance, the tire of FIG. is constructed having a relatively narrow tread arc width (TAW); a wider molded base width, and reduced section width SW. The liner 36 may be constructed of one turn of 0.026 inch gauge material, rather than conventional two turns of 0.026 inch material in order to reduce mass and rolling resistance. The chafer 51 gauge may be reduced at a reference point where the toe guard of the tire ends to 0.01 inches rather than conventional 0.07 inches to further reduce mass and rolling resistance. As shown in FIG. 2, the tire has a top belt 62 preferably of 148 mm and a bottom belt 64 of 158 mm to reduce mass and further reduce rolling resistance. The belt angles preferred in the FIG. 2 are 21 degrees for the top and bottom belts 62, 64. The undertread gauges of the tread layer 56 may be 0.06 inches at the centerline of the tread and in the shoulders. The tread base in layer 54 is constructed having a gauge of 0.015 inches. The gauge thicknesses set forth above are intended to be representative of component thicknesses suitable for achieving rolling resistance and handling objectives. The invention, however, is not intended to limited to the gauge described and component gauges may be modified to suit particular tire application constructions.

Following is a chart identifying G' storage modulus value ranges for the prior art FIG. 1 tire components and the FIG. 2 embodiment of the invention. The G' storage modulus value ranges (measured in MPa) for materials used in the identified tire components of the FIG. 2 tire results in the desired reduced rolling resistance.

| PRIOR ART | | | | |
|---|---|---|---|---|
| | Rubber Process RPA G' 1% Max | RPA G' 1% Min | RPA G' 1% Ave | MPa RPA TD 1% RP Max |
| Ply Compound | 1500 | 1000 | 1250 | 0.090 |
| Apex | 23200 | 3000 | 13100 | 0.160 |
| Sidewall | 1800 | 710 | 1255 | 0.200 |
| Belt Treatment | 2900 | 1100 | 2000 | 0.100 |
| Tread Compound | 3200 | 2900 | 3050 | 0.190 |
| Tread Base Compound | 1700 | 1200 | 1450 | 0.110 |
| Subtread Compound | 3200 | 2900 | 3050 | 0.190 |

| FIG. 2 | | | |
|---|---|---|---|
| RPA G' 1% Max | RPA G' 1% Min | RPA G' 1% Ave | RPA TD 1% RP Max |
| Ply 12 Compound | 1200 | 960 | 1080 | 0.029 |
| Apex —none | | | | |
| Sidewall 42 | 1000 | 580 | 790 | 0.085 |
| Belt Treatment 62, 64 | 7900 | 4400 | 6150 | 0.281 |
| Tread Compound 54 | 3500 | 2300 | 2900 | 0.116 |
| Tread Base Compound 54 | 15400 | 5500 | 10450 | 0.161 |
| Subtread Compound 56 | 3800 | 2500 | 3150 | 0.057 |

Figure 3:
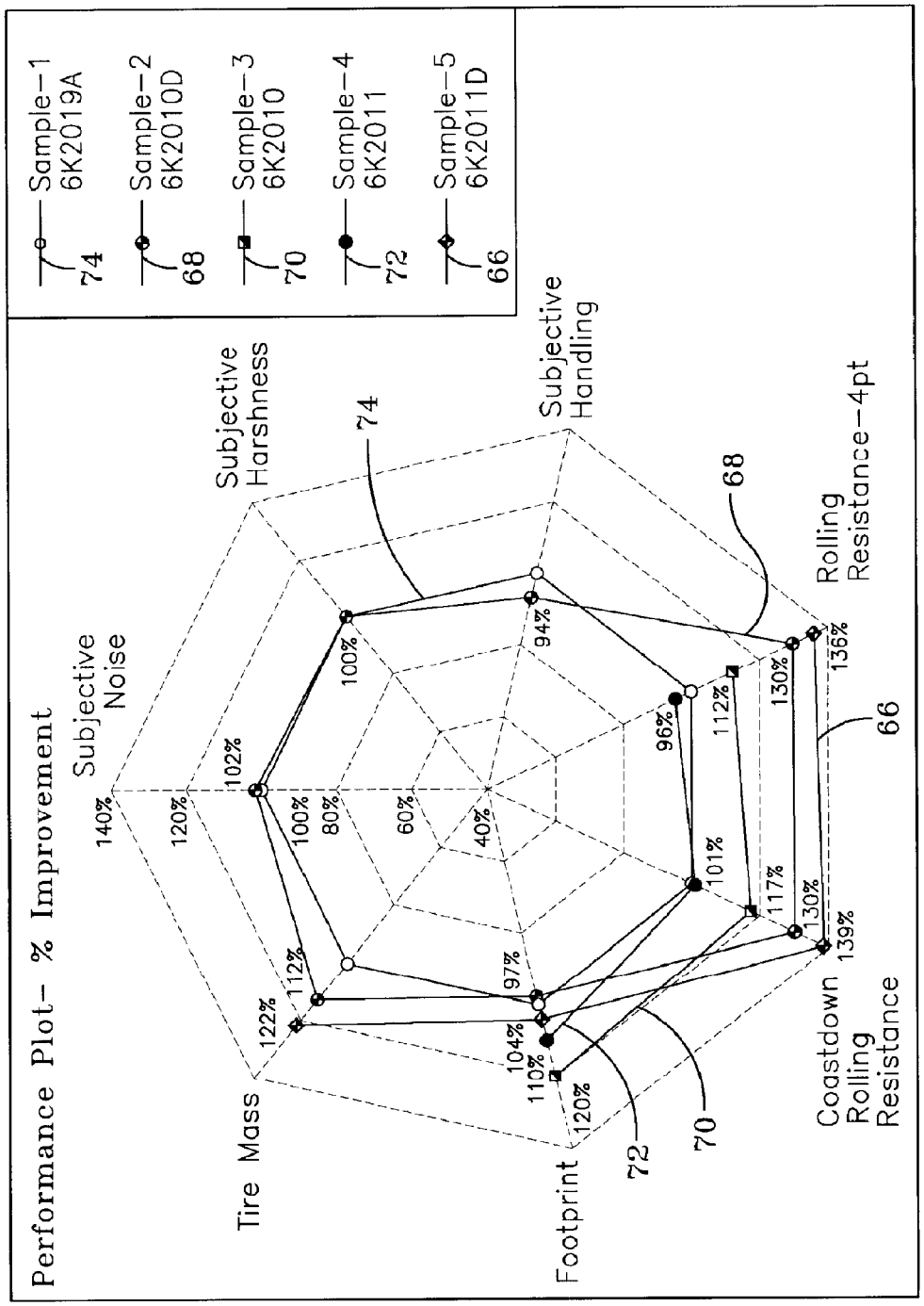
FIG. 3 is a performance plot showing % of improvement of five tire samples; two configured according to the invention and three representing production tires of the prior art.

A performance plot of five samples, showing percentage improvement or degradation in seven tire parameters is shown in FIG. 3. Two samples 66, 68 tires tested were configured as described above and shown in FIG. 2. A rolling resistance improvement of 136% (decrease in rolling resistance) and 139% coastdown rolling resistance for the sample 66 was measured. The footprint of the sample 66 improved (decreased) to 104%; tire mass (decreased) improved 122%. For the sample 68, coastdown rolling resistance improved (decreased) 130%; rolling resistance 130%; subjective handling degraded 94%; subjective harshness remained the same (100%); subjective noise improved (decreased) 102%; tire mass improved 112%; and the footprint degraded 97%. As will be appreciated for both samples 66 and 68 configured pursuant to the invention, significant improvement (decrease) in rolling resistance was achieved without sacrificing performance to a significant degree in tire handling, harshness, noise, and footprint. The other three samples 70, 72, and 74 are based on tires of conventional construction as shown in FIG. 1 and are likewise plotted in FIG. 3.

From the foregoing, it will be noted that a tire configured as shown in FIG. 2 and described above will exhibit an improved lower rolling resistance while handling as required. The effective low weight, low rolling resistance tire of FIG. 2 is both efficient and maintains handling performance as illustrated in FIG. 3. The tire of FIG. 2 results in a 22% lower mass, 39% improvement in lab coastdown rolling resistance and 36% improvement in lab 4 point rolling resistance with near equivalent handling compared to existing production control tires 70, 72, 74.

What is claimed is:

1. A pneumatic radial tire of the type having a circumferentially extending equatorial plane of the tire, the tire comprising a carcass, a tread radially outward of the carcass, the carcass comprising at least one carcass reinforcing ply, opposing bead portions, and opposing sidewalls, the carcass reinforcing ply having a main portion extending between the opposing bead portions and a pair of turnup portions, each turnup portion extending from one end of the main portion, each bead portion having a bead core, and a reinforcement cavity outward of each bead core configured, the cavity located between the main portion and one turnup portion of the at least one reinforcing ply, the tire characterized by:

the reinforcement cavities being apex-less and having a dimension and configuration for close receipt of a chipper layer therein, each reinforcement cavity situated between a ply turnup tire portion and ply main portion and having a substantially constant width along a chipper layer-receiving midsection;

a chipper layer located in each of the reinforcement cavities in each bead portion of the tire and adjacent to the at least one carcass reinforcing ply wherein the chipper layer is a chopped carbon fiber and aramid composite reinforced elastomeric layer.

2. The tire of claim 1 wherein the chipper layer is located adjacent to and axially inward of the carcass reinforcing ply turnup portion.

3. The tire of claim 1 wherein the chipper layer is located adjacent to and axially outward of the carcass reinforcing ply main portion.

4. The tire of claim 1 wherein the chipper layer has a thickness within a range of 0.005 and 0.015 inches.

5. The tire of claim 4 wherein the chipper layer has a substantially constant thickness along a chipper layer midsection extending between a radially outward chipper layer end and a radially inward chipper layer end adjacent to the bead core.

6. The tire of claim 5, wherein the chipper layer is situated between the carcass ply main portion and turnup portion and the carcass comprises a single carcass reinforcing ply.

7. The tire of claim 1 wherein the tire sidewalls having a radial height SH extending from an radially inward end proximate a bead core and extending to a radially outer end proximate the tread, the tire having a section width SW located within a range of 0.4 to 0.44 of the sidewall radial height from the bead core.

8. The tire of claim 7, wherein the SW is located within a range of 0.1" to 0.3" inches from the radially outward end of the chipper layer in a radial direction.

9. The tire of claim 1, wherein the tread comprises a radially inward first layer formed of a relatively low rolling resistance, relatively stiff, low hysterisis compound and a radially outward second layer formed of a compound containing silica.

10. The tire of claim 9 wherein the tire sidewalls having a radial height SH extending from a radially inward end proximate a bead core and extending to a radially outer end proximate the tread first layer, the tire having a section width SW located within a range of 0.6 to 0.56 of the sidewall radial height from the tread first layer.

11. The tire of claim 10, wherein the SW is located within a range of 0.1" to 0.3" inches from the radially outward end of the chipper layer in a radial direction.

12. The tire of claim 11, wherein the chipper layer has a substantially constant thickness along a chipper layer midsection within a range of 0.005 and 0.015 inches.

* * * * *